United States Patent
Mattes et al.

(10) Patent No.: US 6,687,576 B2
(45) Date of Patent: Feb. 3, 2004

(54) ARRANGEMENT FOR PLAUSIBILIZING A ROLLOVER DECISION

(75) Inventors: Bernhard Mattes, Sachsenheim (DE); Juergen Kissner, Schwieberdingen (DE); Walter Wottreng, Takasaki (JP); Hans-Peter Lang, Ludwigsburg (DE); Kosmas Knoedler, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 10/018,919

(22) PCT Filed: Apr. 5, 2001

(86) PCT No.: PCT/DE01/01320

§ 371 (c)(1),
(2), (4) Date: Apr. 11, 2002

(87) PCT Pub. No.: WO01/79036

PCT Pub. Date: Oct. 25, 2001

(65) Prior Publication Data

US 2002/0135168 A1 Sep. 26, 2002

(30) Foreign Application Priority Data

Apr. 19, 2000 (DE) .......................................... 100 19 416

(51) Int. Cl.$^7$ .......................... B60R 21/01; G06F 17/00

(52) U.S. Cl. ................................. 701/1; 701/38; 701/70; 280/5.514; 280/756

(58) Field of Search .................................. 701/1, 70, 37, 701/38, 72, 75, 79, 80, 91; 702/150; 280/5.506, 5.513, 5.514, 755, 756

(56) References Cited

U.S. PATENT DOCUMENTS 6,002,974 A * 12/1999 Schiffmann .................. 701/36

FOREIGN PATENT DOCUMENTS

| DE | 196 50 629 | 6/1998 |
|----|------------|--------|
| DE | 197 44 083 | 4/1999 |
| EP | 0 430 813  | 6/1991 |

* cited by examiner

Primary Examiner—Tan Q. Nguyen
(74) Attorney, Agent, or Firm—Kenyon & Kenyon

(57) ABSTRACT

In order to perform a simple plausibility check of a rollover decision which is as reliable as possible, an arrangement is provided which signal plausibility of the rollover decision if an acceleration measured in the direction of the vertical axis of the vehicle is either above a preset upper threshold or below a preset lower threshold, or if the acceleration measured in the direction of the vertical axis is between the two thresholds, but an acceleration measured in the direction of the transverse axis of the motor vehicle simultaneously exceeds a threshold which depends on the acceleration measured in the direction of the vertical axis.

4 Claims, 2 Drawing Sheets

ARRANGEMENT FOR PLAUSIBILIZING A ROLLOVER DECISION

FIELD OF THE INVENTION

The present invention relates to an arrangement for plausibility checking of a rollover decision in a motor vehicle, with one or more yaw rate sensors and/or acceleration sensors detecting movements of the vehicle and a processor deriving a decision from the sensor signals as to whether the vehicle movements will result in a rollover, and with an arrangement being present which, from measured accelerations in the direction of the vertical axis and transverse axis of the motor vehicle, forms a criterion for plausibility checking of a rollover decision which has been made.

BACKGROUND INFORMATION

An arrangement is known from German Published Patent Application No. 197 44 083 which generates a trigger signal for restraint devices in the motor vehicle when, on the basis of measured yaw rates and/or accelerations, it recognizes an imminent rollover event of the motor vehicle. If a rollover of a vehicle is going to occur, all of the passenger protection devices installed in the vehicle, such as the roll bar, seat belt tightening system, airbags, etc., must be deployed at the correct time. In order that all of these protective devices can be deployed at the correct time, it must be recognized as early as possible whether movements of the motor vehicle, e.g., rotations around its longitudinal axis, its transverse axis, or its vertical axis, will result in a rollover. The restraint devices in the vehicle are also to be deployed only if a rollover of the vehicle actually occurs.

In order to avoid incorrect rollover decisions and thus incorrect deployments of restraint devices, every rollover decision is subjected to a plausibility check according to German Published Patent Application No. 197 44 083. Errors in a rollover decision could, for example, occur because yaw rate and/or acceleration sensors or a processor in which the rollover decision is produced operate incorrectly. According to German Published Patent Application No. 197 44 083, the plausibility check occurs in that two rollover decision criteria are produced and an imminent rollover event is signaled and deployment of restraint devices occurs only if both decision criteria are received simultaneously. The first rollover decision criterion is produced solely from the yaw rates of the motor vehicle around its longitudinal, transverse, and vertical axes. The second decision criterion is derived from measured accelerations in the direction of the three vehicle axes, with first the tilt angle of the vehicle around its longitudinal and transverse axes being calculated from the measured accelerations and this tilt angle being subjected to a threshold decision. Nothing is stated about the process of the threshold decision in this publication.

SUMMARY OF THE INVENTION

The present invention has as its object the provision of an arrangement of the type initially described which performs a plausibility check of a rollover decision which is as reliable as possible at low cost.

The object stated is achieved that an arrangement is present which signal the plausibility of the rollover decision if the acceleration measured in the direction of the vertical axis is either greater than a preset upper threshold or less than a preset lower threshold, or if the acceleration measured in the direction of the vertical axis is between the two thresholds, but the acceleration measured in the direction of the transverse axis simultaneously exceeds a threshold which depends on the acceleration measured in the direction of the vertical axis.

According to the present invention, a reliable plausibility criterion for a rollover decision is derived solely from the accelerations measured in the direction of the vertical axis and the transverse axis of the vehicle.

Therefore, either the threshold for acceleration in the direction of the transverse axis associated with each acceleration value in the direction of the vertical axis can be stored in a table or the acceleration threshold in the direction of the transverse axis can be calculated from the current acceleration measured in the direction of the vertical axis according to a predefined algorithm.

The threshold for the acceleration in the direction of the transverse axis is preferably an acceleration measured in the direction of the longitudinal axis of 1 g (g is acceleration due to gravity), and the threshold for the acceleration in the direction of the transverse axis declines to a value less than 1 g with acceleration in the direction of the vertical axis increasing from 1 g to 3 g and decreasing from 1 g to 0.2 g.

DETAILED DESCRIPTION

Figure 1:
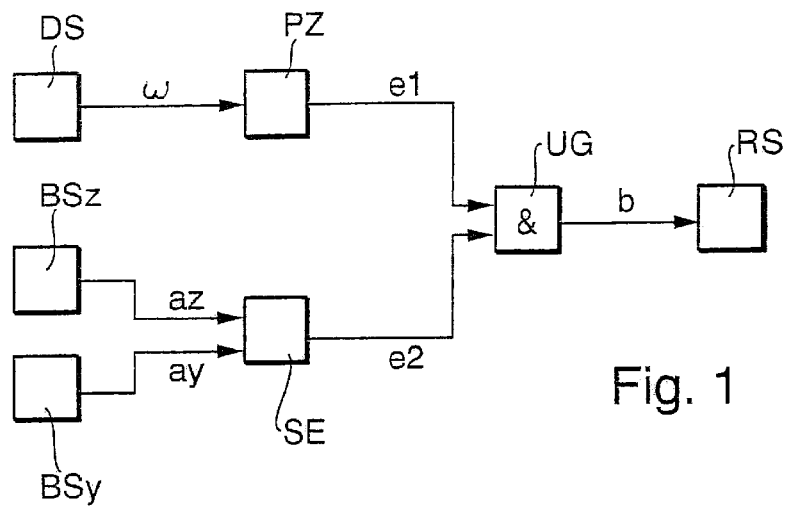
FIG. 1 shows a block diagram of an arrangement for plausibility checking of a rollover decision.

The arrangement shown in FIG. 1 for detecting an imminent rollover event of a vehicle has one or more yaw rate sensors DS, which measure at least the yaw rate $\omega$ around one axis in the longitudinal direction of the vehicle. The at least one measured yaw rate $\omega$ is fed to a processor PZ, which infers from the measured data whether the vehicle movement detected will result in a rollover according to a predefined algorithm. If the measurement data evaluation in processor PZ shows that a rollover of the vehicle is imminent, processor PZ supplies a rollover decision signal e1 at its output. In order to be sure that this rollover decision e1 is not erroneous, a plausibility check is performed. A trigger signal b for restraint devices RS (e.g., airbags, roll bar, seat belt tightening system, etc.) is generated only if a signal branch for plausibility checking, which is described in the following, also provides a rollover decision signal e2. In FIG. 1, the gating of both rollover decision signals e1 and e2 and trigger signal b arising from this is symbolized by an AND gate UG.

Two acceleration sensors BSz, BSy are located in the signal b ranch for plausibility checking of rollover decision el. Acceleration sensor BSz measures acceleration az of the vehicle in the direction of its vertical axis, and acceleration sensor BSy measures acceleration ay of the vehicle in the direction of its transverse axis.

Figure 2:
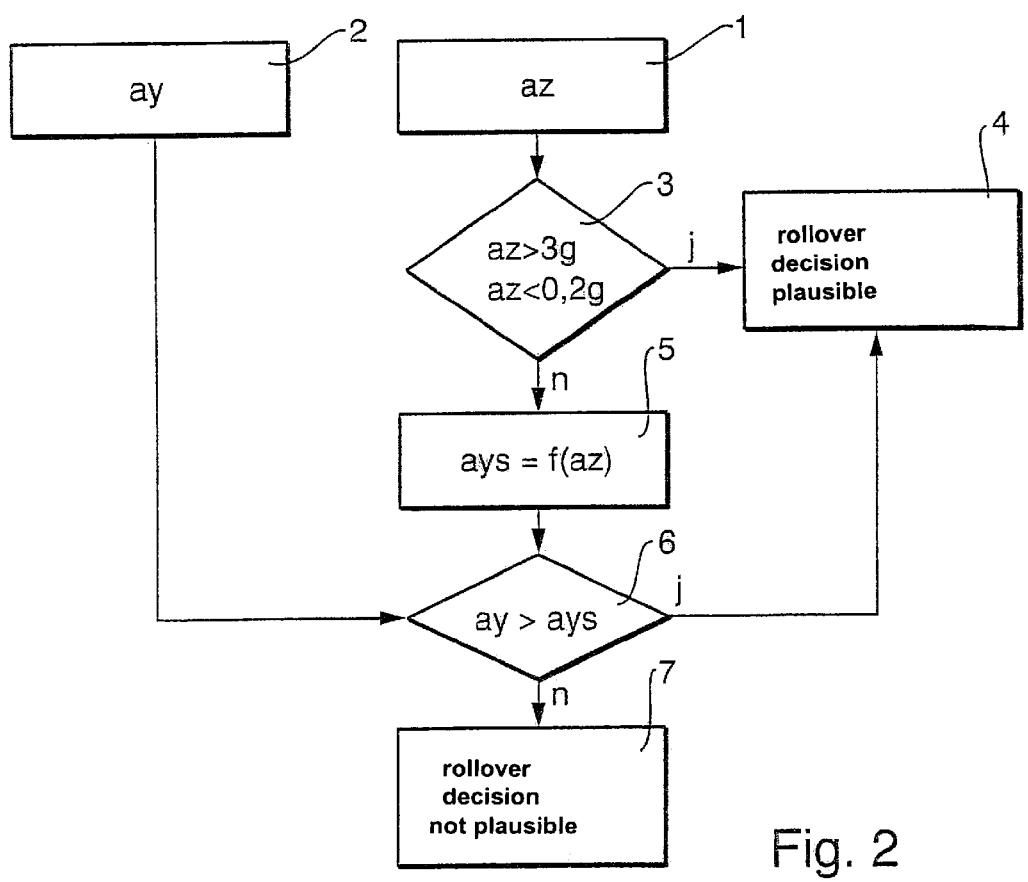
FIG. 2 shows a flow diagram for plausibility checking of a rollover decision.

Measurement signals az and ay provided by the two acceleration sensors BSz, BSy are fed to a threshold decision circuit SE. How threshold decision circuit SE performs the plausibility check of the rollover decision is explained with reference to the flow diagram shown in FIG. 2. According to method steps 1 and 2, first accelerations az and ay measured in the direction of the vertical axis and in the direction of the transverse axis are recorded. Measured accelerations az and ay are subjected in the following method steps to a threshold decision process, which is explained by the threshold diagram shown in FIG. 3.

Figure 3:
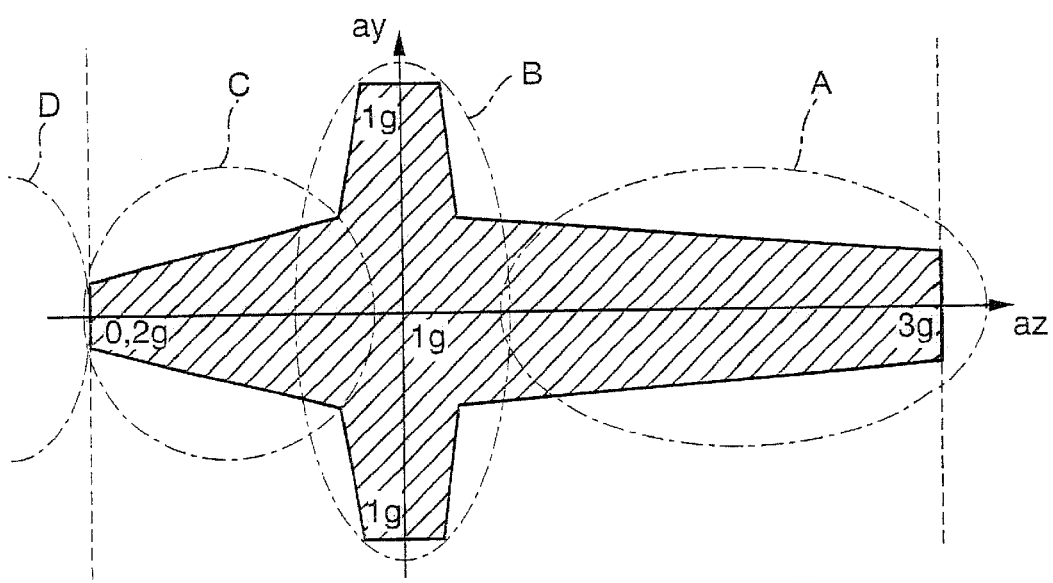
FIG. 3 shows a threshold diagram for measured accelerations in the direction of the vertical and transverse axes of a vehicle.

In the threshold diagram of FIG. 3, acceleration az is plotted in the direction of the vertical axis of the vehicle and acceleration ay is plotted in the direction of the transverse axis of the vehicle. Ranges for acceleration ax and acceleration ay which are characteristic for various driving maneuvers are indicated by circles and/or ellipses in the threshold diagram. Area A, which is characterized by high acceleration az in the direction of the vertical axis and low acceleration ay in the direction of the transverse axis of the vehicle, is characteristic for driving on steep curves. Area B, in which acceleration az in the direction of the vertical axis is low and acceleration ay in the direction of the transverse axis is high, is characteristic of slalom driving. Area C is characterized by a constant ratio of the two accelerations az and ay and is thus characteristic for driving on an inclined plane. Area D, in which both acceleration az in the direction of the vertical axis and acceleration ay in the direction of the transverse axis are close to 0 g, is characteristic for a free fall of the vehicle. This is because the sensors do not provide any measurement signals during a free fall due to weightlessness.

If measured acceleration az in the direction of the vertical axis of the vehicle is less than a lower threshold of 0.2 g—a free fall of the vehicle is occurring—a rollover decision which is made should be confirmed as plausible in any case and restraint systems RS should be deployed. The same applies if measured acceleration az in the direction of the vehicle vertical axis exceeds an upper threshold of 3 g. In method step 3 (FIG. 2), measured acceleration az in the direction of the vehicle vertical axis is compared with these two thresholds 0.2 g and 3 g described, and in step 4 a rollover decision is declared plausible if measured acceleration az either exceeds the upper threshold of 3 g or falls below the lower threshold of 0.2 g.

If measured acceleration az in the direction of the vertical axis of the vehicle is between the two limits of 0.2 g and 3 g and, in addition, measured acceleration ay in the direction of the vehicle transverse axis is within the crosshatched region of the threshold diagram in FIG. 3, a rollover decision should be declared not plausible in any case. As can be inferred from the threshold diagram in FIG. 3, there is a certain dependence between the threshold for acceleration ay in the direction of the vehicle transverse axis, shown by dashed lines, and measured acceleration az in the direction of the vehicle vertical axis. This dependence is determined individually for each vehicle type. In FIG. 3, the relationship between threshold ays for acceleration ay in the direction of the vehicle transverse axis and the measured acceleration az in the direction of the vehicle vertical axis is shown in simplified form with straight (dashed) lines. Notwithstanding the illustration, there can be greatly varying relationships between threshold asy of acceleration ay and measured acceleration az. In principle, however, threshold ays for acceleration ay in the direction of the vehicle transverse axis declines if acceleration az in the direction of the vehicle vertical axis either increases from 1 g to 3 g or decreases from 1 g to 0.2 g. The configuration in which acceleration az in the direction of the vehicle vertical axis is 1 g and acceleration ay in the direction of the transverse axis of the vehicle is less than 1 g should be emphasized. In this situation, the vehicle is in a normal driving maneuver in which it has ground contact with all 4 wheels. A rollover of the vehicle is very probable only if acceleration ay in the direction of the transverse axis exceeds 1 g.

If it is determined in the threshold decision in method step 3 that measured acceleration az in the direction of the vehicle vertical axis is not less than 0.2 g and not greater than 3 g, in method step 5, threshold ays=f(az) for measured acceleration ay in the direction of the vehicle vertical axis is determined depending on measured acceleration value az. The relationship ays=f(az) is either stored in a table in threshold decision circuit SE or associated threshold ays for acceleration ay is calculated for each measured acceleration value az according to a predefined algorithm. In the following method step 6, current measured acceleration value ay in the direction of the vehicle's vertical axis is compared with previously determined threshold ays. If measured acceleration value ay exceeds the threshold ays, i.e., if the measured acceleration ay in the direction of the vehicle transverse axis lies outside the crosshatched region (see FIG. 3), rollover decision e1 output by processor PZ is declared plausible. If, however, measured acceleration value ay is less than threshold ays, i.e., ay lies in the crosshatched region of the threshold diagram, rollover decision el of processor PZ is declared not plausible in method step 7. In this case, threshold decision circuit SE does not supply a signal e2.

What is claimed is:

1. An arrangement for performing a plausibility check of a rollover decision in a motor vehicle, comprising:

an arrangement including at least one of at least one yaw rate sensor and at least one acceleration sensor and for detecting a movement of the vehicle, the arrangement providing a sensor signal;

a processor for deriving a decision from the sensor signal as to whether the vehicle movement will result in a rollover; and an arrangement for producing, from a measured acceleration in a direction of a vertical axis of the motor vehicle and a measured acceleration in a direction of a transverse axis of the motor vehicle, a criterion for performing the plausibility check of the rollover decision which has been made, wherein:

the arrangement for producing the criterion signals the plausibility of the rollover decision if one of the following is true:

if the measured acceleration in the direction of the vertical axis is one of greater than a preset upper threshold and less than a preset lower threshold, and if the measured acceleration in the direction of the vertical axis is between the preset upper threshold and the preset lower threshold and the measured acceleration in the direction of the transverse axis simultaneously exceeds a threshold that depends on the measured acceleration in the direction of the vertical axis.

2. The arrangement according to claim 1, further comprising:

a table for storing the threshold that depends on the measured acceleration in the direction of the vertical axis.

3. The arrangement according to claim 1, wherein:

the arrangement for producing the criterion calculates the threshold that depends on the measured acceleration in the direction of the vertical axis according to a predefined algorithm.

4. The arrangement according to claim 1, wherein:

the threshold that depends on the measured acceleration in the direction of the vertical axis is 1 g when the measured acceleration in the direction of the vertical axis is 1 g, and the threshold that depends on the measured acceleration in the direction of the vertical axis decreases to a value less than 1 g with an increase of the measured acceleration in the direction of the vertical axis from 1 g to 3 g and with a decrease of the measured acceleration in the direction of the vertical axis from 1 g to 0.2 g.

* * * * *